United States Patent [19]

Fujimoto et al.

[11] Patent Number: 5,258,459
[45] Date of Patent: Nov. 2, 1993

[54] RESIN COMPOSITION FOR COATING AND ELECTRODEPOSITION COATING COMPOSITION CONTAINING THE SAME

[75] Inventors: Norihide Fujimoto, Sennan; Shigeki Tanaka, Amagasaki; Takeshi Fukui, Kawanishi; Yuji Numashima, Nishinomiya, all of Japan

[73] Assignee: Shinto Paint Co., Ltd., Amagasaki, Japan

[21] Appl. No.: 752,786

[22] Filed: Aug. 30, 1991

[30] Foreign Application Priority Data

Aug. 31, 1990 [JP] Japan ............... 2-231024

[51] Int. Cl.$^5$ ............................................. C08L 63/00
[52] U.S. Cl. ........................................ 525/109; 525/911; 204/181.4; 204/181.7
[58] Field of Search ............... 525/109, 911; 204/181.4, 181.7

[56] References Cited

U.S. PATENT DOCUMENTS 4,486,571 12/1984 Holubka ................... 525/109

FOREIGN PATENT DOCUMENTS 3521386 1/1986 Fed. Rep. of Germany .
1174519 11/1989 Japan .

OTHER PUBLICATIONS

Database WPI(L), No. 89-238 903, Derwent Publications Ltd., London * Abstract * & JP-A-01-174 519 (Yoko) Nov. 7, 1989.

*Primary Examiner*—Melvyn I. Marquis
*Assistant Examiner*—D. Aylward
*Attorney, Agent, or Firm*—Wenderoth, Lind & Ponack

[57] ABSTRACT

Disclosed are a resin composition (D) for coating obtained by reacting (A) an epoxy resin, (B) a butadiene-acrylonitrile copolymer having carboxyl groups or amino groups at both terminals of the molecule and (C) a bifunctional mononuclear phenolic compound, and an electrodeposition coating composition comprising the resin composition (D). The coating compositions have high adhesiveness to metal substrates and may form a high corrosion-resistance coat film having good flexibility, chipping-resistance and low temperature properties. The coating compositions are favorably used in car industrial field.

3 Claims, No Drawings

RESIN COMPOSITION FOR COATING AND ELECTRODEPOSITION COATING COMPOSITION CONTAINING THE SAME

FIELD OF THE INVENTION

The present invention relates to a resin composition for coating, which may form a coat film having excellent flexibility and adhesiveness to metal substrates and having excellent chipping resistance, low temperature properties and corrosion resistance, as well as to an electrodeposition coating composition which contains the resin composition.

BACKGROUND OF THE INVENTION

In various fields of car bodies and parts, as well as household electric appliances, steel products, steel furniture, construction materials and construction machines, epoxy type cationic electrodeposition coating compositions capable of forming coat films having high corrosion resistance are widely utilized. Recently, in the field of car industry, the coating compositions are needed to form coat films having much improved corrosion resistance. In addition, the coat films are strongly desired to have much improved chipping resistance and low temperature properties.

Under the situation, improvement and investigation of coating compositions of containing various flexible components have been made in these days. For instance, Japanese Patent Publication No. 41670/81 has proposed use of butadiene-acrylonitrile copolymers; and Japanese Patent Kokai No. 254732/89 has proposed incorporation of an urethanediol into a chain extender of an epoxy resin. The proposed techniques would be effective for improving the flexibility of the coat films, but they are still insufficient for improving the adhesiveness of the coat films to metal substrates, especially the adhesiveness at a low temperature, and the chipping resistance of them.

SUMMARY OF THE INVENTION

The present inventors earnestly studied for the purpose of overcoming the above-mentioned problem and, as a result, have found that an epoxy resin as chain-extended with a bifunctional mononuclear phenolic compound yields noticeably improving adhesiveness to metal substrates. On the basis of the finding, they have produced a resin composition for coating, which may form a coat film having extremely excellent flexibility and having extremely excellent adhesiveness to a metal substrate, by modifying an epoxy resin with a butadiene-acrylonitrile copolymer having carboxyl groups or amino groups at both terminals of the molecule and a bifunctional mononuclear phenolic compound, and they also have produced an electrodeposition coating composition containing the resin composition. Specifically, there are provided in accordance with the present invention (I) a resin composition (D) for coating obtained by reacting (A) an epoxy resin, (B) a butadiene-acrylonitrile copolymer having carboxyl groups or amino groups at both terminals of the molecule and (C) a bifunctional mononuclear phenolic compound, and (II) an electrodeposition coating composition containing the resin composition (D). The bifunctional mononuclear phenolic compound is represented by the formula:

wherein X is OH or COOH and Y is H, $C_nH_{2n+1}$, $OC_nH_{2n+1}$ or

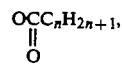

in which n is 1 to 10.

DETAILED DESCRIPTION OF THE INVENTION

The resin composition (D) of the present invention is obtained by reacting the epoxy groups (x g equivalents) in the epoxy resin (A), the carboxyl groups or amino groups (y g equivalents) existing at the both terminals in the butadiene-acrylonitrile copolymer (B) and the phenolic hydroxyl groups (z g equivalents) of the bifunctional mononuclear phenolic compound (C) whereupon the components (A), (B) and (C) are blended to satisfy the condition of $x > (y+z)$. In view of the properties of the coat film to be formed from the resin composition of the present invention as well as of the stability of the resin composition of itself and of the coating operatability with the composition, the ratio of $x/(y+z)$ is preferably 1.1 or more, and the mean molecular weight (epoxy equivalent) per the remaining epoxy groups $(x-(y+z))$ is preferably to fall within the range of from 300 to 2500.

For effecting the reaction of (A), (B) and (C), in general, they are put in a pertinent reactor and reacted therein optionally in the presence of a pertinent organic solvent (for example, aromatic hydrocarbons such as toluene or xylene ketones such as methyl ethyl ketone or methyl isobutyl ketone; monoalcohol esters such as ethylene glycol or propylene glycol; and acetates thereof are preferred) and a reaction catalyst (for example, tertiary amines such as triethylamine, tributylamine or benzyldimethylamine; and phosphines such as triethylphosphine, tributylphosphine or triphenylphosphine are preferred). In the case, the amount of the catalyst to be used is preferably from 0.01 to 1.0% by weight.

The reaction is effected generally at an ordinary pressure and at a temperature of from 60° to 18° C. for a period of from 1 to 10 hours until the intended epoxy equivalent can be obtained.

Measurement of the epoxy equivalent is effected by the method mentioned below.

(1) About one g of a sample is weighed in a 200 ml Erlenmeyer flask.
(2) 25 ml of dioxane is added thereto so as to dissolve the sample therein.
(3) 25 ml of 1/5N hydrochloric acid/dioxane solution is added thereto, stirred and blended.
(4) 25 ml of methanol and cresol red indicator are added to the reaction system, which is then titrated with 1/10N sodium hydroxide/methanol solution.
(5) The point when the color of the test liquid has converted from yellow to reddish violet is the titration end point.

The epoxy equivalent is calculated from the following formula:

$$Epoxy\ Equivalent = [1000 \times S \times (NV/100)]/(F \times V)$$

where
F means a factor of 1/10N sodium hydroxide/methanol solution;
V means an amount (ml) of 1/10N sodium hydroxide/methanol solution consumed in titration;
S means a weight (g) of the sample;
NV means a solid content (%) of the sample.

The content of the above-mentioned butadiene-acrylonitrile copolymer (B) having carboxyl groups or amino groups at both terminals of the molecule is from 1 to 80% by weight, preferably from 5 to 60% by weight. If the content is less than 1% by weight, the flexibility of the coat film to be formed from the composition as well as the adhesiveness thereof to substrates would be insufficient. If, on the contrary, it is more than 80% by weight, the stability of the resin emulsion would be poor so that the stability of the coat film from the composition is unfavorably poor. The content of the bifunctional mononuclear phenolic compound (C) is from 1 to 30% by weight, preferably from 2 to 20% by weight. If the content is less than 1% by weight, the adhesiveness of the coat film to be formed from the composition would be insufficient. If, on the contrary, it is more than 30% by weight, the flexibility of the coat film would be unfavorably insufficient.

The number average molecular weight of the resin composition (D) of the present invention is obtained by conventional GPC (gel permeation chromatography). It is preferably from 600 to 5000. If it is less than 600, the corrosion resistance of the coating film to be formed from the composition would be insufficient, but if it is more than 5000, the emulsification of the constitutive components would be poor so that the stability of the coating composition is to be inconveniently bad.

Where the resin composition (D) is applied to an electrodeposition coating composition in accordance with the present invention, the following two methods are employable. The first method is that a compound (I) having one secondary amino group in one molecule or a compound (I) and a compound (J) which is not basic and is reactive with epoxy group, such as monocarboxylic acids, monophenolic compounds or monothiolic compounds, is/are reacted with 95% or more of the epoxy groups as remained in the resin composition (D) and the resulting resin composition (W) is neutralized with an acid to form an intended water-dispersing or water-soluble composition for electrodeposition coating.

In the method, the proportion of the compounds (I) and (I) are so adjusted that the basic group content in the resin composition (S) may be from 0.3 to 3.0 mmol, especially preferably from 0.8 to 2.0 mmol, per gram of the composition. If the content is less than 0.3 mmol, emulsification of the composition in water would be difficult and the stability of the composition is to be unfavorably poor. If, on the contrary, it is more than 3.0 mmol, too much current would be applied to the composition in electrodeposition operation to yield too much electrolysate gas so that an even and uniform coat film could not be formed and that the quality of the coat film formed would be poor (for example, the acid resistance of the coating film is bad), though emulsification of the composition would be easy.

The second method is that 95% or more of the epoxy groups as remained in the resin composition (D) obtained by reacting the above-mentioned (A) to (C) are reacted with a monocarboxylic compound (E) to form a resin composition (F), in the same manner as in the first method.

Since the thus obtained resin composition (F) does not have any basic group, it could not be dispersible or soluble in water by itself to form an electrodeposition coating composition. Therefore, a basic group-containing resin composition (G) is added to the composition (F) in such a way that the proportion of (F)/(G) by weight may be from 0.05/0.95 to 0.95/0.05, more preferably from 0.1/0.9 to 0.6/0.4, to give a resin composition (H), and this is neutralized with an acid to finally obtain an intended water-dispersing or water-soluble composition for electrodeposition coating.

Like the above-mentioned resin composition (W), the basic group content in the resin composition (H) is also from 0.3 to 3.0 mmol, especially preferably from 0.8 to 2.0 mmol, per gram of the composition. The number average molecular weight of the composition by GPC method is preferably from 600 to 5000.

The basic group-containing resin composition (G) to be used herein is not specifically limitative but any and every known basic group-containing resin which is generally used in conventional electrodeposition coating compositions may be employed. For instance, there are mentioned amine-modified epoxy resins (such as those described in Japanese Patent Publication No. 4978/78, Japanese Patent Kokai No. 93024/79, Japanese Patent Publication No. 47143/78, and Japanese Patent Kokai Nos. 8673/78, 80436/80 and 206442/84), amine-modified polyurethane polyol resins (such as those described in Japanese Patent Kokai Nos. 15449/79 and 115476/80), amine-modified polybutadiene resins (such as those described in Japanese Patent Kokai Nos. 16048/78, 142444/78 and 90273/85), and the like amino group-containing resins, sulfonium group-containing resins and phosphonium group-containing resins.

The epoxy resin (A) to be used in the present invention is an epoxy group-containing substance having more than one 1,2-epoxy equivalent, preferably about two 1,2-epoxy equivalents. Precisely, the substance is a polyepoxide having more than one epoxy group, preferably about two epoxy groups, in average per one molecule. More preferred polyepoxides are polyglycidyl ethers of polyphenols or aromatic polyols (e.g., bisphenol A).

Such polyepoxides ar formed by etherification of an aromatic polyol with an epihalohydrin or dihalohydrin (e.g., epichlorohydrin or dichlorohydrin) in the presence of an alkali. Examples of usable aromatic polyols include 2,2-bis(4-hydroxyphenyl)propane, 1,1-bis(4-hydroxyphenyl)ethane, bis(4-hydroxyphenyl)methane, 2-methyl-1,1-bis(4-hydroxyphenyl)ethane, bis(4-hydroxyphenyl)propane, 2,2-bis(4-hydroxy-3-tert-butylphenyl)propane, bis(2-hydroxynaphthyl)methane, and 1,5-dihydroxynaphthalene.

In addition, oxyalkylated adducts of such aromatic polyols (for example, ethylene oxide or propylene oxide adducts of aromatic polyols) may also be used as a polyol component.

As such polyepoxides, those having epoxy equivalents of at least from 180 to 4000, preferably from 180 to 3000, more preferably from 180 to 2000, are used singly or as a mixture of two or more of them.

The above-mentioned epoxy resin (A) may previously be modified with a compound of a reaction product obtained by reacting one mol of a polyether glycol having a molecular weight of from 300 to 3000 and 2 mols of a diisocyanate, the reaction product having from 1.5 to 2.0 isocyanate groups in the molecule. In the case, the isocyanate group-having compound is used in an amount of from 1 to 50% by weight, preferably from 10 to 40% by weight, to the epoxy resin (A). If it is less than 1% by weight, the flexibility of the coat film to be imparted by the compound would be small; but if it is more than 40% by weight, the coat film could not have sufficient corrosion resistance and hardness, unfavorably.

The compound which is a reaction product obtained by reacting one mol of a polyether glycol having a molecular weight of from 300 to 3000 and 2 mols of a diisocyanate and which has from 1.5 to 2.0 mols of isocyanate group in one molecule is obtained by reacting one mol of a polyether glycol having a molecular weight of from 300 to 3000, preferably from 400 to 2000, and two mols of a diisocyanate compound in the absence or presence of a solvent which is inert to isocyanates (for example, ketones such as methyl ethyl ketone or methyl isobutyl ketone; aromatic hydrocarbons such as toluene or xylene; or esters such as ethoxyethanol acetate, butylcarbitol acetate, isobutyl acetate), at a temperature of from 20° to 150° C. by urethanation reaction until the isocyanate group concentration may be from 1.5 to 2.0 mols per one molecule. In the case, a tertiary amine or a tin compound may be used as a catalyst, if desired. As examples of polyether glycols having a molecular weight of from 300 to 3000 to be used in the reaction, there are mentioned adducts of polyethylene glycol, polypropylene glycol or bisphenol A and ethylene oxide or propylene oxide, as well as adducts of hydrogenated bisphenol A and ethylene oxide or propylene oxide.

If the polyether glycols to be used herein are those having a molecular weight of less than 300, they would be ineffective for imparting flexibility to the coat film to be formed from the coating composition. If, however, polyether glycols having a molecular weight of more than 3000 are used, unfavorable high polymer substances would be formed by reaction with diisocyanates to cause rapid increase of the viscosity of the composition. Such a highly viscous composition is unfavorable, as giving a coat film with poor surface smoothness by electrodeposition.

Diisocyanate compounds to be used herein are not specifically defined but any and every diisocyanate compounds which are generally used for forming conventional electrodeposition coating compositions may be employed. For instance, there are mentioned aliphatic diisocyanates, alicyclic diisocyanates, and aliphatic-aromatic diisocyanates.

The butadiene-acrylonitrile copolymer (B) having carboxyl groups or amino groups at both terminals of the molecule, which is employed in the present invention, is preferably one having a molecular weight of from 1500 to 5000 and an acrylonitrile content of from 5 to 40% by weight. As examples of available commercial products of the copolymer, there are mentioned Hycar ® CTBN Series products (all produced by B. F. Goodrich Co.). These commercial products have a molecular weight of about 3500, a carboxyl content of from 2.4 to 3%, a number of carboxyl groups of from 1.8 to 2.3, in average, per molecule, and an acrylonitrile content of 10, 18 or 27%.

Amino group-containing butadiene/acrylonitrile copolymers can be produced, for example, by reacting the above-mentioned carboxyl group-containing butadiene/acrylonitrile copolymer and a diamine. As available commercial products of the copolymer of the type, there are mentioned Hycar ATBN 1300×16 and Hycar ATBN 1300×21 (having an acrylonitrile content of 16% by weight and 10% by weight, respectively) (both produced by B. F. Goodrich Co.).

The bifunctional mononuclear phenolic compound (C) for use in the present invention is one having two hydroxyl groups on the benzene ring or one hydroxyl group and one carboxyl group on the same. As examples of the compound, there are mentioned resorcinol, alkylresorcinols, hydroquinone, pyrogallol monomethyl ether, pyrogallol mono-n-butyl ester, and para-hydroxybenzoic acid, resorcinol being most preferable.

In accordance with the above-mentioned first method of the present invention, the epoxy group in the resin composition (D) to be obtained by reaction of (A), (B) and (C) is reacted with a compound (I) having one secondary amino group in one molecule. As examples of the compound (I), ketimine compounds are referred to, which are obtained by reaction of a secondary alkylamine (such as dimethylamine, diethylamine or dibutylamine), a secondary alkylalkanolamine (such as diethanolamine, dipropanolamine, methylethanolamine, ethylethanolamine or methylpropanolamine), a cyclic amine (such as pyrrolidine, piperidine or morpholine), or a polyamine having one secondary amino group and one or more primary amino groups in one molecule (such as monomethylaminoethylamine, monoethylaminopropylamine, diethylenetriamine or dibutylenetriamine), and a ketone such as methyl ethyl ketone, methyl isobutyl ketone or cyclohexanone.

In accordance with the above-mentioned second method of the present invention, the epoxy group in the resin composition (D) to be obtained by reaction of (A), (B) and (C) is reacted with a monocarboxylic acid compound (E). The compound (E) is not specifically defined but any and every monocarboxylic acid which has heretofore been generally used in preparing conventional electrodeposition coating compositions can be employed. Especially preferably, monocarboxylic acids having a hydroxyl group or an ethylenic unsaturated bond in the molecule are employed.

As preferred examples of the acids, there are mentioned hydroxyacetic acid, 2-hydroxypropanoic acid, dimethylolpropionic acid, 1,2-hydroxystearic acid, acrylic acid, and methacrylic acid.

The monocarboxylic acid is reacted with the epoxy group in the resin composition (D) in the presence of a catalyst of a tertiary amine or a phosphine at a temperature of from 100 to 160° C. for esterification, so that it is introduced into the resin composition (D) of the present invention.

The resin compositions (W) and (H) to be applied to the electrodeposition coating composition of the present invention is neutralized with an acid to be converted into water-dispersing or water-soluble compositions and are used as electrodeposition coating compositions. Acids which are usable for the purpose may be either inorganic acids or organic acids. For instance, usable acids include nitric acid, hydrochloric acid, phosphoric acid, sulfuric acid, lactic acid, formic acid, acetic acid, propionic acid, and butyric acid.

The electrodeposition coating composition of the present invention is in the form of an aqueous dispersion containing resins and pigments. In addition to water, the composition may further contain any other solvents such as hydrocarbons, alcohols, esters, ethers and ketones. Though not critical, the content of such solvents may be from 0.1 to 40% by weight, preferably from 0.5 to 25% by weight, to the resin solid content in the composition.

If desired, the electrodeposition coating composition of the present invention may contain any known hardening agent which is generally used in conventional electrodeposition compositions, for example, aminoplast resins such as urea/formaldehyde resins, melamin resins or benzoguanamine resins; blocked isocyanate crosslinking agents; crosslinking agents having at least two active ester groups in average in one molecule and being able to be hardened by esteraminolysis and/or esterification, such as β-hydroxyalkyl ester crosslinking agents described in European Patent 040867 and carboalkoxymethyl ester crosslinking agents described in European Patent 102501; or urea condensates described in German OLS 3,311,514. Preferably, the composition contains such a hardening agent in an amount of from 15 to 40% by weight. Advantageously, the agent may be added to the resin composition (W) or (H), after the composition has been neutralized with an acid and before it is dispersed in water.

The electrodeposition coating composition of the present invention may further contain, if desired, any other additives, for example, pigments, auxiliary agents, solvents and hardening catalysts.

For electrodeposition, the solid content in the coating bath is adjusted to be from 5 to 45% by weight, preferably from 10 to 30% by weight. Deposition of the solid film is effected in a conventional manner, for example, at a temperature of from 15° to 40° C. for a period of from 30 to 360 seconds. The pH value of the coating bath may be adjusted to fall within the range of from 4.5 to 9.0, preferably from 5.0 to 8.0. The deposition voltage is preferably from 50 to 500 volt. The substrate to be coated is set as a cathode. The deposited film is fired at 80° to 220° C. for 3 to 40 minutes, depending upon the kind of the hardening agent therein.

Next, the present invention will be explained in more detail by way of the following examples, which, however, are not intended to restrict the scope of the present invention.

PRODUCTION EXAMPLE 1:

Production of Resin Composition (W):

|   |   | mol. | wt. pts. | wt. % |
|---|---|---|---|---|
| (1) | Bisphenol A Epoxy Resin having epoxy equivalent of 186 | 3.0 | 1116 | 33.3 |
| (2) | Butadiene-Acrylonitrile Copolymer having carboxyl groups at both terminals (Hycar CTBN 1300 × 13, product by B. F. Goodrich, molecular weight 3000, acrylonitrile content 27%) | 0.6 | 1800 | 53.7 |
| (3) | Resorcinol (bifunctional mononuclear phenolic compound) | 0.6 | 66 | 2.0 |
| (4) | Bisphenol A | 0.4 | 91 | 2.7 |
| (5) | Tributylamine |  | 6 |  |
| (6) | Xylene |  | 762 |  |
|   | Sub-total |  | (3841) |  |
| (7) | Diethanolamine | 2.66 | 279 | 8.3 |
| (8) | Ethoxypropanol |  | 70 |  |
|   | Total |  | (4190) | (100) |

The above-mentioned components (1) to (6) were put in a 5-liter four-neck flask equipped with a condenser, a thermometer and a stirrer and were heated with stirring. They were reacted at 135° C. for 5 hours to produce an epoxy resin having an epoxy equivalent of 1100 (g(solid content)/equivalent). Subsequently, the reaction system was cooled to 60° C., and the components (7) and (8) were added thereto and heated up to 80° C. Then, they were reacted at 80° C. for 2 hours to obtain a modified resin (a) having a tertiary amino group content of 0.866 milli-equivalent/g (solid content). This had a number average molecular weight of 2100 and had a solid content of 80%.

PRODUCTION EXAMPLE 2

Production of Resin Composition (W):

|   |   | mol | wt. pts. | wt. % |
|---|---|---|---|---|
| (1) | Bisphenol F Epoxy Resin (having epoxy equivalent of 186) | 1.9 | 707 | 59.8 |
| (2) | Bisphenol A Epoxy Resin (having epoxy equivalent of 475) | 0.1 | 95 | 8.0 |
| (3) | Butadiene-Acrylonitrile Copolymer having carboxyl groups at both terminals (Hycar CTBN 1300 × 31, product by B. F. Goodrich, molecular weight 3000, acrylonitrile content 10%) | 0.05 | 150 | 12.7 |
| (4) | Resorcinol (bifunctional mononuclear phenolic compound) | 1.45 | 160 | 13.5 |
| (5) | Tributylamine |  | 2.4 |  |
| (6) | Xylene |  | 293.1 |  |
|   | Sub-total |  |  |  |
| (7) | Methylethanolamine | 0.95 | 71.3 | 6.0 |
|   | Total |  | (1478.8) | (100) |

The above-mentioned components (1) to (6) were put in a 3-liter four-neck flask having the same constitution as the flask used in the previous Production Example 1 and heated with stirring. They were then reacted at 140° C. until the epoxy equivalent of the resulting product became 2000. Next, the reaction system was cooled to 60° C., and the component (7) was added thereto. The reactants were reacted for further 2 hours at 80° C. to obtain a modified epoxy resin (b) having a tertiary amino group content of 0.80 milli-equivalent/g(solid content) and a number average molecular weight of 2300.

PRODUCTION EXAMPLE 3

Production of Resin Composition (W):

|     |                                                                                                                                                              | mol  | wt. pts. | wt. %  |
| --- | ------------------------------------------------------------------------------------------------------------------------------------------------------------ | ---- | -------- | ------ |
| (1) | H-(OCH₂CH₂)₅—O—⟨⟩—C(CH₃)₂—⟨⟩—O-(CH₂CH₂O)₅-H (bisphenol A-ethylene oxide adduct)                                                                             | 0.25 | 167      | 6.1    |
| (2) | Xylene                                                                                                                                                       |      | 278      |        |
| (3) | Tolylene Diisocyanate                                                                                                                                        | 0.5  | 87       | 3.2    |
| (4) | Xylene                                                                                                                                                       |      | 238      |        |
| (5) | Bisphenol A Epoxy Resin (having epoxy equivalent of 475)                                                                                                     | 1.0  | 950      | 34.5   |
|     | Sub-total                                                                                                                                                    |      | (1720)   |        |
| (6) | Butadiene-Acrylonitirle Copolymer having primary amino groups at both terminals (Hycar ATBN 1300 × 16, product by B. F. Goodrich, amine equivalent 900, acrylonitrile content 16.5%) | 0.25 | 900      | 32.7   |
| (7) | Ethoxypropanol                                                                                                                                               |      | 657.5    |        |
| (8) | Cardula E-10 (monoepoxy resin, product by Yuka Shell)                                                                                                        | 0.5  | 125      | 4.5    |
| (9) | Resorcinol (bifunctional mononuclear phenolic compound)                                                                                                      | 0.8  | 88       | 3.2    |
| (10)| Bisphenol A Epoxy Resin having epoxy equivalent of 186                                                                                                       | 0.8  | 298      | 10.8   |
| (11)| Tributylamine                                                                                                                                                |      | 5.5      |        |
| (12)| Diethanol                                                                                                                                                    | 1.3  | 137      | 5.0    |
|     | Total                                                                                                                                                        |      | (3931)   | (100)  |

The above-mentioned components (1) and (2) were put in a 2-liter four-neck flask having the same constitution as the flask used in the previous Production Example 1 and stirring of the components was initiated. The component (3) was added thereto at a temperature not higher than 30° C., and the reaction system was heated up to 70° C. with taking care of the exothermic reaction. Then the reactants were reacted at 70° C. for 2 hours. Subsequently, a dissolved mixture of the components (4) and (5) as previously prepared in a separate container was added to the reaction system, which was reacted further for 3 hours at 90° C. to obtain an urethane-modified epoxy resin. The components (6) and (7) were put in a separate 5-liter four-neck flask, then stirred and heated up to 60° C. Subsequently, the component (8) was gradually added thereto and reacted at 60° C. for one hour. To this were added the previously prepared urethane-modified epoxy resin and the components (9), (10) and (11), and the whole was heated up to 140° C. The reactants were then reacted at 140° C. until the epoxy equivalent of the resulting product became 1850. Afterwards, the reaction system was cooled, and the component (12) was added thereto at 60° C. and reacted at 80° C. for 2 hours to obtain a modified epoxy resin (c) having a solid content of 70% and a tertiary amino group content of 0.65 milli-mol/g(solid content). This had a number average molecular weight of 4800.

PRODUCTION EXAMPLE 4

Production of Resin Composition (F)

|     |                                                                                                     | mol  | wt. pts. | wt. %  |
| --- | --------------------------------------------------------------------------------------------------- | ---- | -------- | ------ |
| (1) | Bisphenol A Epoxy Resin having epoxy equivalent of 186                                              | 2.9  | 1079     | 53.7   |
| (2) | Bisphenol A Epoxy Resin having epoxy equivalent of 950                                              | 0.1  | 190      | 9.4    |
| (3) | Butadiene-Acrylonitrile Copolymer having carboxyl groups at both terminals (Hycar CTBN 1300 × 13, product by B. F. Goodrich) | 0.1  | 300      | 14.9   |
| (4) | Resorcinol (bifunctional mononuclear phenolic compound)                                             | 2.0  | 220      | 10.9   |
| (5) | Bisphenol A                                                                                         | 0.2  | 46       | 2.3    |

-continued

|     |                        | mol  | wt. pts. | wt. %  |
| --- | ---------------------- | ---- | -------- | ------ |
| (6) | Tributylamine          |      | 3.7      |        |
| (7) | Xylene                 |      | 455.3    |        |
|     | Sub-total              |      | (2294)   |        |
| (8) | Dimethylolpropionic Acid | 1.3 | 178      | 8.8    |
| (9) | Ethoxypropanol         |      | 94       |        |
|     | Total                  |      | (2566)   | (100)  |

The above-mentioned components (1) to (7) were put in a 3-liter four-neck flask having the same constitution as the flask used in the previous Production Example 1 and reacted at 135° C. for 5 hours with stirring, to produce an epoxy resin having an epoxy equivalent of 1310. Next, the components (8) and (9) were added thereto and reacted further for about 3 hours at 135° C. until the acid value of the reaction product became 0 (zero), to obtain a modified epoxy resin (d) having a solid content of 80% and a number average molecular weight of 4000 and containing no basic group.

PRODUCTION EXAMPLE 5

Production of Resin Composition (G)

|     |                                                        | mol  | wt. pts. | wt. %  |
| --- | ------------------------------------------------------ | ---- | -------- | ------ |
| (1) | Bisphenol A Epoxy Resin having epoxy equivalent of 186 | 3.0  | 1116     | 29.5   |
| (2) | Bisphenol A Epoxy Resin having epoxy equivalent of 475 | 2.0  | 1900     | 50.2   |
| (3) | Dimethylaminopropylamine                               | 3.0  | 390      | 10.3   |
| (4) | Diethanolamine                                         | 3.6  | 378      | 10.0   |
| (5) | Ethoxypropanol                                         |      | 1622     |        |
|     | Total                                                  |      | (5406)   | (100)  |

The above-mentioned components (1), (2) and (3) were put in a 6-liter four-neck flask having the same constitution as that used in the previous Production Example 1 and dissolved at 100° C., then cooled to 60° C., and a mixture comprising the components (4) and (5) was added thereto. The whole was kept at 80° C. for 2 hours with taking care of the exothermic reaction, and an amino-modified epoxy resin (e) having a tertiary amino group of 2.5 mmol/g (solid content) was obtained. This had a solid content of 70%.

PRODUCTION EXAMPLE 6

Production of Resin Composition not containing bi-functional mononuclear phenolic compound (C):

| | mol | wt. pts. | wt. % |
|---|---|---|---|
| (1) Bisphenol A Epoxy Resin having epoxy equivalent of 186 | 3.0 | 1116 | 32.6 |
| (2) Butadiene-Acrylonitrile Copolymer having carboxyl groups at both terminals (Hycar CTBN 1300 × 13, product by B. F. Goodrich) | 0.6 | 1800 | 52.6 |
| (3) Bisphenol A | 1.0 | 228 | 6.7 |
| (4) Tributylamine | | 6.3 | |
| (5) Xylene | | 779.7 | |
| Sub-total | | (3930) | |
| (6) Diethanolamine | 2.66 | 279 | 8.2 |
| (7) Ethoxypropanol | | 70 | |
| Total | | (4279) | (100) |

The components of this examples are same as those of the previous Production Example 1, except that resorcinol was removed. The components were processed in the same manner as in Production Example 1 and a modified epoxy resin (f) having a number average molecular weight of 2200, a solid content of 0% and a tertiary amino group content of 0.78 mmol/g (solid content) was obtained.

PRODUCTION EXAMPLE 7

Production of Resin Composition not containing butadieneacrylonitrile copolymer (B):

| | mol | wt. pts. | wt. % |
|---|---|---|---|
| (1) Bisphenol A Epoxy Resin having epoxy equivalent of 186 | 3.0 | 1116 | 69.0 |
| (2) Resorcinol | 1.2 | 132 | 8.2 |
| (3) Bisphenol A | 0.4 | 91.2 | 5.6 |
| (4) Triphenylphosphine | | 2.7 | |
| (5) Xylene | | 335.5 | |
| Sub-total | | (1677.4) | |
| (6) Diethanolamine | 2.66 | 279 | 17.2 |
| (7) Ethoxypropanol | | 66.4 | |
| Total | | (2022.8) | (100) |

The components of this examples are same as those of the previous Production Example 1, except that butadieneacrylonitrile copolymer was removed. The components were processed in the same manner as in Production Example 1 and a modified epoxy resin (g) having a number average molecular weight of 1100, a solid content of 80% and a tertiary amino group content of 1.64 mmol/g (solid content) was obtained.

PRODUCTION EXAMPLE 8

Production of Block Isocyanate Hardening Agent:

| | | mol | wt. pts. |
|---|---|---|---|
| (1) | toluene Diisocyanate | 3.0 | 522 |
| (2) | Methyl Isobutyl Ketone | | 433 |
| (3) | Butoxyethanol | 3.0 | 354 |
| (4) | Trimethylolpropane | 1.0 | 134 |

-continued

| | mol | wt. pts. |
|---|---|---|
| Total | | (1443) |

The above-mentioned components (1) and (2) were put in a 2-liter four-neck flask having the same constitution as the flask used in the previous Production Example 1 and the component (3) was dropwise added thereto over a period of one hour with stirring at 40° C. After addition, the whole was continued to be at 40° C. for further one hour and thereafter the component (4) was added thereto. Then the whole was heated up to 60° C. and reacted at 60° C. until the percentage of the residual isocyanate group in the reaction mixture became 0 (zero) by titration. A block isocyanate hardening agent solution having a solid content of 70% was obtained.

PRODUCTION EXAMPLE 9

Production of Pigment Dispersion:

| | | wt. pts. | wt. pts. of solid content |
|---|---|---|---|
| (1) | Amino-modified Epoxy Resin (e) of Production Example 5 | 1429 | 1000 |
| (2) | Acetic Acid | 48 | |
| (3) | Water | 4203 | |
| (4) | Carbon Black | 80 | 80 |
| (5) | Titanium Dioxide | 2000 | 2000 |
| (6) | Aluminium Silicate | 1500 | 1500 |
| (7) | Lead Silicate | 250 | 250 |
| (8) | Dibutyl Tin Oxide | 50 | 50 |
| (9) | Butoxyethanol | 200 | |
| | Total | 9760 | 4880 |

The above-mentioned components (1), (2) and (3) were put in a clean 10-liter cylindrical stainless steel container, then stirred with a dissolver and dissolved. The components (4) to (9) were added thereto and fully blended, and the resulting blend was then dispersed with a 1.5-liter motor mill (beads dispersing machine, produced by ———) to a dispersion having a grain size of 5μ or less. Thus, a highly stable pigment dispersion having a solid content of 50% was obtained.

EXAMPLES 1 TO 4, COMPARATIVE EXAMPLES 1 TO 4

The resin components as indicated in Table 1 below were put in a 5-liter four-neck flask having the same constitution as the flask used in the previous Production Example 1 and processed at 90° to 100° C. under a reduced pressure of 50 to 60 mmHg for removal of solvents. The resulting resin blend was then gradually added to a cylindrical stainless steel container previously containing a determined amount of formic acid and a determined amount of water with fully stirring for emulsification to obtain a resin varnish having a solid content of 35%. To this were added the previously prepared pigment dispersion and water, to obtain an electrodeposition coating liquid having a solid content of 20%. This was applied to a zinc phosphate-treated steel sheet and to a non-treated steel sheet by cathode electrodeposition, and the coated layer was then baked at 170° C. for 20 minutes to form a coat film having a thickness of about 20μ. The properties of the coat film thus formed were tested, and the test results are shown in Table 1 below.

TABLE 1

| | | | | Example 1 | Example 2 | Example 3 | Example 4 | Comparative Example 1 |
|---|---|---|---|---|---|---|---|---|
| Components of Coating Composition | Components of Resin Composition | Resin Composition | a (solid content 80%) | 525 | | | | |
| | | | b (solid content 80%) | | 525 | | | 50 |
| | | | c (solid content 80%) | | | 600 | | |
| | | (F) | d (solid content 80%) | | | | 263 | |
| | | (G) | e (solid content 70%) | | | | 300 | 800 |
| | | Comparative Resin Composition | f (solid content 80%) | | | | | |
| | | | g (solid content 80%) | | | | | |
| | | B Butadiene-Acrylonitrile Copolymer (wt. %) | | 53.7 | 12.7 | 32.7 | 7.45 | 0.85 |
| | | C Bifunctional Mononuclear Phenolic Compound (wt. %) | | 2.0 | 13.5 | 3.2 | 5.45 | 0.90 |
| | | [Amino group content (milli-equivalent/g (solid content) | | 0.87 | 0.80 | 0.65 | 1.25 | 2.39 |
| | | Block isocyanate Hardening Agent | | 257 | 257 | 257 | 257 | 257 |
| | | Hexyl Cellosolve | | 18 | 18 | 18 | 18 | 18 |
| | | Formic Acid | | 8 | 8 | 8 | 8 | 8 |
| | | Water | | 906 | 906 | 831 | 868 | 853 |
| | | [Total of Resin Varnish](solid content 35%) | | 1714 | 1714 | 1714 | 1714 | 1714 |
| | | Pigment Dispersion (solid content 50%) | | 651 | 651 | 651 | 651 | 651 |
| | | Water | | 2262 | 2262 | 2262 | 2262 | 2262 |
| | | [Total of Electrodeposition Coating Composition](solid content 20%) | | 4627 | 4627 | 4627 | 4627 | 4627 |
| Properties of Coat Film | Film Appearance | | | ○ | ○ | ○ | ○ | ○ |
| | Low-Temperature Bending (mm)(note-1) | | | 0 | 0 | 0 | 0 | 2.5 |
| | Erichsen (mm) | | | 8< | 8< | 8< | 8< | 3.5 |
| | DuPont Impact (cm) (−20° C., ½ inch, 500 g) | | | 50< | 50< | 50< | 50< | 30 |
| | Salt Spray (note-2), Non-treated Steel Sheet, 480 hours | | | ○ | ○ | ○ | ○ | ○ |
| | Salt Spray (note-2), Zinc Phosphate-Treated Steel Sheet, 1000 hours | | | ○ | ○ | ○ | ○ | ○ |
| | Fiber Rust (note-3) (Zinc Phosphate-Treated Steel Sheet) | | | ⊚ | ⊚ | ⊚ | ⊚ | ○ |

| | | | | Comparative Example 2 | Comparative Example 3 | Comparative Example 4 |
|---|---|---|---|---|---|---|
| Components of Coating Composition | Components of Resin Composition | Resin Composition | a (solid content 80%) | | | |
| | | | b (solid content 80%) | | | |
| | | | c (solid content 80%) | | | |
| | | (F) | d (solid content 80%) | | | |
| | | (G) | e (solid content 70%) | | 857 | |
| | | Comparative Resin Composition | f (solid content 80%) | 525 | | |
| | | | g (solid content 80%) | | | 525 |
| | | B Butadiene-Acrylonitrile Copolymer (wt. %) | | 52.6 | 0 | 0 |
| | | C Bifunctional Mononuclear Phenolic Compound (wt. %) | | 0 | 0 | 8.2 |
| | | [Amino group content (milli-equivalent/g (solid content) | | 0.78 | 2.50 | 1.64 |
| | | Block isocyanate Hardening Agent | | 257 | 257 | 257 |
| | | Hexyl Cellosolve | | 18 | 18 | 18 |
| | | Formic Acid | | 8 | 8 | 8 |
| | | Water | | 906 | 831 | 906 |
| | | [Total of Resin Varnish](solid content 35%) | | 1714 | 1714 | 1714 |
| | | Pigment Dispersion (solid content 50%) | | 651 | 651 | 651 |
| | | Water | | 2262 | 2262 | 2262 |
| | | [Total of Electrodeposition Coating Composition](solid content 20%) | | 4627 | 4627 | 4627 |
| Properties of Coat Film | Film Appearance | | | ○ | ○ | ○ |
| | Low-Temperature Bending (mm)(note-1) | | | 1.5 | 2.5 | 2.0 |
| | Erichsen (mm) | | | 5.0 | 3.0 | 5.5 |
| | DuPont Impact (cm) (−20° C., ½ inch, 500 g) | | | 40 | 30 | 25 |
| | Salt Spray (note-2), Non-treated Steel Sheet, 480 hours | | | ○ | ○ | ○ |
| | Salt Spray (note-2), Zinc Phosphate-Treated Steel Sheet, 1000 hours | | | ○ | ○ | ○ |
| | Fiber Rust (note-3) (Zinc Phosphate-Treated Steel | | | Δ | Δ | Δ |

TABLE 1-continued

Sheet)

Deposition Voltage 200 to 280 V (28° C., 3 min.); Thickness of Coat Film 20μ; Baking Condition 170° C., 20 min.

Notes:
(note-1)
The cut portion was bent with a 2 mmφ rod, an adhesive tape was applied to the bent portion; and the width of the coat as peeled with the adhesive was measured.
(note-2)
This was measured by JIS K-5400-9-1.
○: The rust width from the cross-cut part was less than 3 mm.
Δ: The rust width from the cross-cut part was from 3 to 5 mm.
X: The rust width from the cross-cut part was more than 5 mm.
(note-3)
After salt-spray for 72 hours, the sample was allowed to stand at 40° C. and 95% RH for 480 hours. The fiber rust width from the cross-cut part was measured.
◎: Less than 1.0 mm
○: From 1.0 mm to 2 mm
Δ: More than 2 mm to less than 3 mm
▲: From 3 mm to less than 5 mm
X: 5 mm or more All numbers in Table 1 mean parts by weight, unless otherwise specifically indicated.

The resin composition for coating of the present invention and the electrodeposition coating composition containing it have high adhesiveness to metal substrates and may form a high corrosion-resistance coat film having good flexibility, chipping-resistance and low temperature properties. Accordingly, the coating compositions of the present invention may favorably be used in various industrial fields especially in car industrial field.

While the invention has been described in detail and with reference to specific embodiments thereof, it will be apparent to one skilled in the art that various changes and modifications can be made therein without departing from the spirit and scope thereof.

What we claim is:

1. An electrodeposition coating composition comprising a resin coating composition (D) obtained by reacting (A) an epoxy resin, (B) a butadiene-acrylonitrile copolymer having carboxyl groups at both terminals of the molecule and (C) resorcinol.

2. An electrodeposition composition according to claim 1 wherein the content of copolymer (B) is 1 to 80% by weight and, the content of component (C) is 1 to 30% by weight, all based on the total weight of the resin composition (D), and wherein the ratio of the epoxy group in resin (A) to the carboxy groups in component (B) plus the phenolic hydroxyl groups in component (C) is 1.1 or more.

3. An electrodeposition composition according to claim 1 wherein the number average molecular weight of the resin (D) is 600 to 5,000.

* * * * *